Feb. 26, 1957 S. L. HARGROVE ET AL 2,782,489
ROTARY METAL CUTTER
Filed Feb. 4, 1952
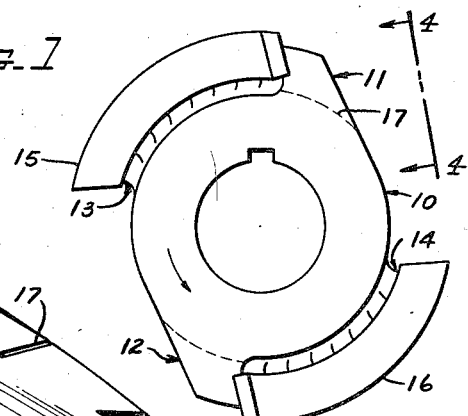
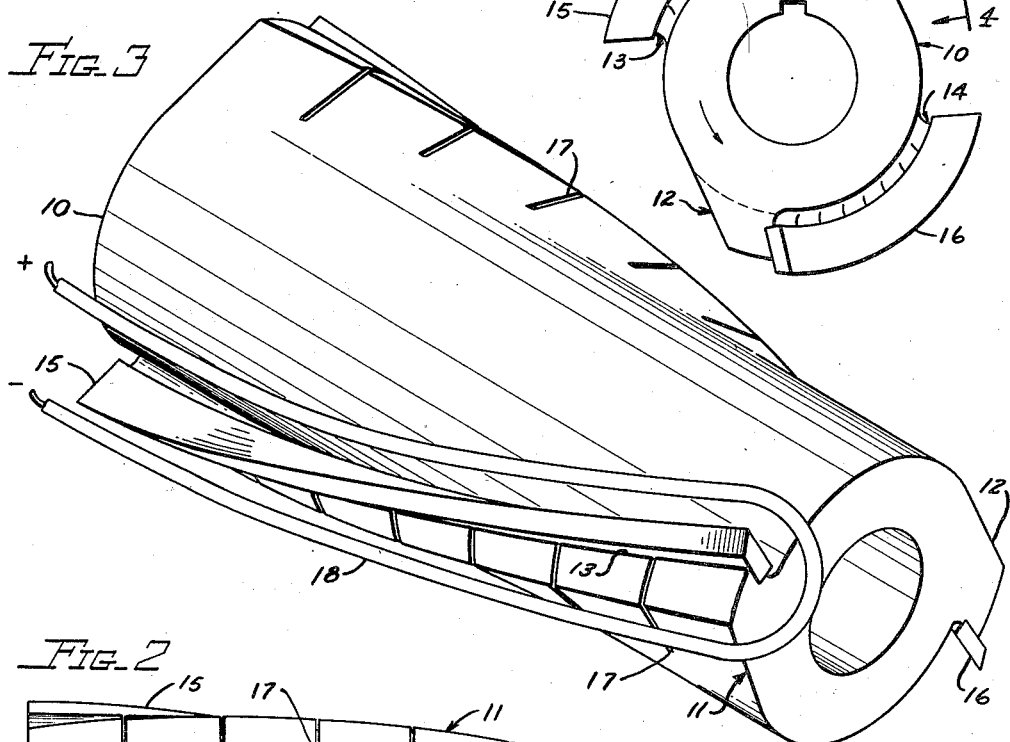
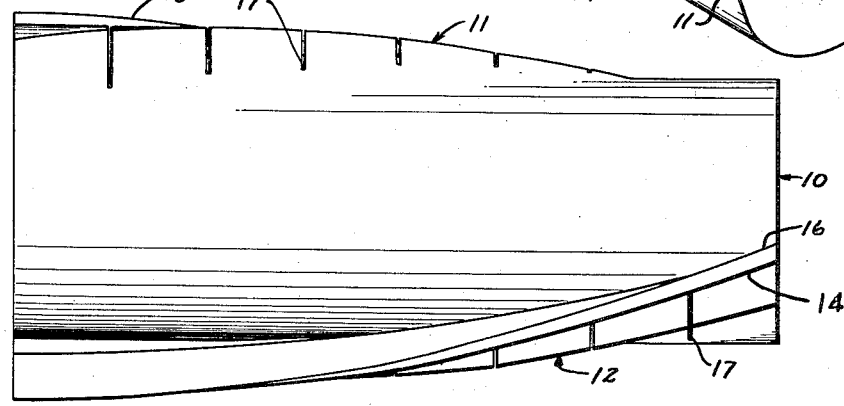
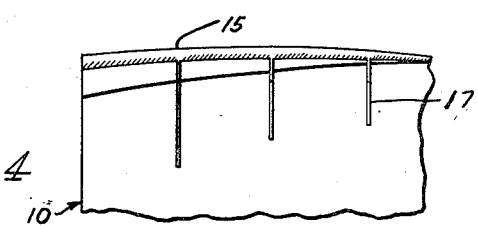
SANFORD L. HARGROVE
THEODORE R. SHARP
INVENTORS
BY Hubert J Miller

United States Patent Office 2,782,489
Patented Feb. 26, 1957

2,782,489

ROTARY METAL CUTTER

Sanford L. Hargrove and Theodore R. Sharp, Wichita, Kans., assignors to Boeing Airplane Company, Wichita, Kans., a corporation of Delaware Application February 4, 1952, Serial No. 269,804

2 Claims. (Cl. 29—103)

This invention may be classified under the general heading of rotary metal cutting tools, and relates more particularly to that type of rotary cutting tools which carry replaceable outwardly projecting cutting blades made of the extremely hard cemented carbides of tungsten, tantalum and titanium in various mixtures or combinations—milling cutters, for instance.

For reasons well known to those familiar with this art, it is highly desirable to provide cutter blades having helical cutting edges for cutters which rotate about an axis parallel to the workpiece surface being cut. Helically shaped cutter blades made from high speed steel have long been used, but blades manufacturers have to date considered it impossible to produce helically shaped blades made from the cemented hard carbides, above mentioned. This is due to the extreme shrinkage of the carbide blade blanks during the sintering process, and the resulting inability to produce any blade having close tolerance measurements or shape. As a result only short length rectilinear blades of tungsten carbide, and the other hard metal carbides, have been available. Tool designers have therefore been forced to arrange these short length carbide blades at spaced intervals along the length of a cutter body in generally helical circumferentially spaced peripheral rows, the blades in each following row being positioned to bridge or lap the respective spaces between the blades in the leading rows, the cutting edges of all blades being ground to simultaneously contact the inner wall surface of an imaginary cylinder of proper diameter, concentric with the cutter axis.

While this design for tungsten carbide cutters is widely used, it is far from completely satisfactory. It has proven impossible to prevent the ends of the short length blades from leaving score marks on the surface of the material being cut. This, of course, has involved extensive hand rework, with resulting increase in cost.

Applicant has recently developed a method of producing long length helical shaped blades made of the hard carbides of tungsten, tantalum, and titanium—a method capable of producing close tolerance measurements and blade shapes, which method constitutes the subject matter of a separate patent application. The present invention relates more specifically to a rotary cutter which utilizes these new long helical blades of hard carbide metal.

It is the primary object of this invention to provide a rotary metal cutter having longitudinally disposed peripherally spaced helically shaped blades made from the hard carbides of tungsten, tantalum, and titanium in various mixtures or combinations.

It is an additional important object to provide a new type cutter body and a means for rigidly mounting the above mentioned metal carbide blades on such body.

It is a further object to provide a method of producing a rotary metal cutter having helically shaped blades made from the hard metal carbides.

The invention, together with other objects, will be more clearly understood when the following description is read in connection with the accompanying drawings in which:

Fig. 1 is an end view of a milling cutter embodying the invention;

Fig. 2 is a side view of the same cutter;

Fig. 3 is a perspective view of the cutter illustrating a method of securing the blades to the cutter body; and Fig. 4 is an enlarged fragmentary view taken from the position indicated by the line 4—4 in Fig. 1.

To simplify the following description and the claims, the generic term "cemented carbides" will be used to denote all the extremely hard carbides of tungsten, tantalum, and titanium in various mixtures and combinations.

The drawings illustrate the invention embodied in an elongated milling cutter approximately twelve inches in length. This cutter includes a steel or cast metal cutter body 10, having a pair of oppositely positioned longitudinally disposed blade seats, designated as a whole by the numerals 11 and 12 (Fig. 1). Each of these seats projects integrally outward from the periphery of the generally cylindrical cutter body 10, and has a single helically shaped blade receiving face, the two faces 13 and 14 having a slight forward pitch to provide the desired cutting angle for blades seated thereon. These seats are preferably of constant height throughout their length. While the illustrated cutter has only two oppositely positioned helical blade seats, it will be understood that three or more circumferentially spaced blade seats may be provided to accommodate the desired number of cutter blades.

Cemented carbide blades 15 and 16, of uniform cross section longitudinally and transversely, are formed in a helix to complementally seat flat against the respective faces 13 and 14. The outer or cutting edge of each blade projects outward beyond the outer edge of its respective face, as clearly shown.

To obtain the necessary rigidity between cutter blade and body the blades are preferably brazed directly to the faces 13 and 14 of the blade seats. In this connection it should be noted that the seats 11 and 12 are provided with longitudinally spaced circumferentially extending slots 17 throughout their length, the depth of each slot being indicated by the broken lines in Fig. 1. In reality, then, each blade seat is made up of a longitudinally extending series of closely spaced substantially triangular shaped protuberances integral with the cutter body and extending outward from its periphery. The various protuberances have cooperating faces which together form the helical faces 13 and 14.

The purpose of these slots through the blade seats 11 and 12 is to allow for the very marked difference in expansion between the ductile cast iron from which the cutter body is preferably made, and the cemented carbide metal of which the blades are made. It was found that when solid or continuous blade seats were used the cutter body metal would lengthen considerably under the brazing heat while the blades were practically unaffected. As the cutter body cooled after the brazing operation, its contraction in length would destroy the bond of the brazing metal and pop the blades off their seats. The slotting of the blade seats localizes their expansion and contraction, and eliminates the above mentioned difficulty.

In brazing the blade to its seat, as illustrated in Fig. 3, the cutter body is rotated so that the face 13 of the seat lies in as nearly a horizontal position as possible. A long strip cut from a sheet of brazing metal is then twisted to substantially the helical form of the seat and is laid flat against the seat. Next the blade is laid on top of the brazing metal strip, and accurately positioned, as desired. A loop type electrical induction heating element 18 is then positioned along both sides of the blade and seat, as shown, and the heating circuit closed. When the adjacent surfaces of the seat and blade have become sufficiently hot, the brazing metal will flow evenly between them and the circuit is broken. Subsequent cooling of the blade and seat will not in any way affect the rigidity of the brazed joints.

Having described the invention, together with the method of producing a cutter embodying it, with sufficient clarity to enable those familiar with this art to construct and use it, I claim:

1. A milling cutter comprising: a generally cylindrical cutter body; a plurality of circumferentially spaced longitudinally disposed outwardly projecting blade seats carried rigidly on the periphery of said cutter body; spaced slots extending circumferentially through said blade seats at intervals throughout their entire length; and a plurality of elongated complementally helical blades of cemented carbide metal spanning the major portion of the slots through each blade seat, one blade rigidly secured to each seat.

2. A milling cutter comprising: a generally cylindrical cutter body; a plurality of longitudinally disposed circumferentially spaced blade seats projecting outwardly from the periphery of said body and joined integrally thereto, each seat having one helically shaped blade receiving face which is generally radially disposed with relation to the cutter body; spaced slots extending circumferentially through said seats and blade receiving faces, dividing the seats into a series of sections each of which is integrally joined to said body at its base; and a helical cemented carbide metal blade seated against each sectional blade receiving face and brazed to the respective individual sections along their adjacent surfaces.

References Cited in the file of this patent

UNITED STATES PATENTS

| | | |
|---|---|---|
| 903,496 | Peck | Nov. 10, 1908 |
| 1,148,597 | Lewis | Aug. 3, 1915 |
| 1,205,630 | Hoglund | Nov. 21, 1916 |
| 1,339,152 | Arnold | May 4, 1920 |
| 1,342,717 | Lipps | June 8, 1920 |
| 1,571,559 | Smith | Feb. 2, 1926 |
| 2,060,959 | Terry | Nov. 17, 1936 |
| 2,474,138 | Zimmerman | June 21, 1949 |
| 2,707,817 | Gondek | May 10, 1955 |